United States Patent [19]
Brock et al.

[11] 3,940,797
[45] Feb. 24, 1976

[54] SHIELDED MAGNETORESISTIVE MAGNETIC TRANSDUCER

[75] Inventors: George W. Brock, Boulder; Frank B. Shelledy, Longmont; Sidney H. Smith, Broomfield; Richard F. M. Thornley, Boulder, all of Colo.

[73] Assignee: International Business Machines Corporation, Armonk, N.Y.

[22] Filed: Feb. 10, 1975

[21] Appl. No.: 548,846

Related U.S. Application Data

[63] Continuation-in-part of Ser. No. 399,218, Sept. 20, 1973, Pat. No. 3,881,190.

[52] U.S. Cl. .................. 360/113; 360/122; 360/123; 360/125
[51] Int. Cl.² .................. G11B 5/16; G11B 5/22
[58] Field of Search .................. 360/113, 122–123, 360/125–126, 129; 324/46

[56] References Cited
UNITED STATES PATENTS

| | | |
|---|---|---|
| 2,712,601 | 7/1955 | Reinwald .......................... 360/113 |
| 3,260,980 | 7/1966 | Weiss ................................ 360/113 |
| 3,493,694 | 2/1970 | Hunt ................................. 360/113 |
| 3,643,035 | 2/1972 | Tsukagoshi ....................... 360/113 |
| 3,716,781 | 2/1973 | Almasi et al. ..................... 360/113 |
| 3,731,007 | 5/1973 | Masuda et al. ................... 360/113 |
| 3,887,945 | 6/1975 | Nepela et al. ..................... 360/113 |
| R26,610 | 6/1969 | Dekoster ........................... 360/113 |

Primary Examiner—Alfred H. Eddleman
Attorney, Agent, or Firm—Gunter A. Hauptman

[57] ABSTRACT

A magnetoresistive (MR) layer is placed offcenter the distance between two shields to enhance self-biasing. Information is carried on a magnetizable medium as recorded magnetic areas. The shields are spaced apart by a distance on the order of and less than the shortest recorded wavelength for which the head is meant to be used. The MR element and the shields have their edges nearest the medium in a common plane perpendicular to the vertical component of a signal from the recorded area. An additional shunt bias layer may be provided immediately adjacent and coextensive the MR element, and the head may serve one or many tracks.

15 Claims, 3 Drawing Figures

SHIELDED MAGNETORESISTIVE MAGNETIC TRANSDUCER

CROSS-REFERENCE TO RELATED APPLICATIONS

This application is a continuation-in-part of Ser. No. 399,218 entitled "Shielded Magnetoresistive Magnetic Transducer and Method of Manufacture Thereof" by G. W. Brock, F. B. Shelledy, S. H. Smith and A. B. Wills filed Sept. 20, 1973, now U.S. Pat. No. 3,881,190.

BACKGROUND OF THE INVENTION

1. Field of the Invention

The invention relates to magnetic transducers and more particularly to heads incorporating magnetoresistive material.

2. Description of the Prior Art

Inductive magnetic heads for recording and reading information on magnetic media are not commercially applicable to many recent problems for the reasons given in the referenced Brock et al application. With reference to the embodiment disclosed in the referenced Brock et al application, it was stated that two shields may be spaced a distance s apart and either equidistant or asymmetric to a magnetoresistive element. One MR element is shown centered between two ferrite elements in an article entitled "Magnetoresistive Read/Write Head" by G. W. Brock, F. B. Shelledy and L. Viele published in the IBM TECHNICAL DISCLOSURE BULLETIN, September, 1972, pages 1206–1207. Two MR elements are placed centrally between shields in a copending application of O. Voegeli entitled "Magnetic Read Head Assembly Having Magnetoresistive Elements", Ser. No. 403,704, filed Oct. 4, 1973, now U.S. Pat. No. 3,876,618, assigned to International Business Machines Corporation, each element biasing the other. An offcenter version of the latter invention appears in an article by S. D. Cheatham and F. B. Shelledy entitled "Self-Biased, Noise-Free Magnetoresistive Head", published in the IBM TECHNICAL DISCLOSURE BULLETIN, page 1862, December, 1974.

The distortion resulting from imperfect biasing of a magnetoresistive element is unacceptable in wide band recording systems. In theory, the application of a bias field to an MR element provides a desirable linear change of resistivity in response to the signal flux. However, in practice, a quadratic term is present which will give rise to undesirable second harmonic distortion of the signal. This distortion can be made acceptably small by keeping the maximum field due to the signal small with respect to the bias field. However, this approach undesirably reduces head output. The problem is especially severe in wide band systems which experience a wide range of signal strengths. Either the head must be designed for low distortion of the long wavelength signals, or the second harmonic will be large compared to the weaker short wavelength signals. In either case, the superior signal-to-noise ratio of the MR element is lost. Experiments show that in practical heads using MR elements, the head response curves depart from the quadratic form as the MR element approaches saturation so that there is an inflection point where the second harmonic vanishes for small signals. While biasing the element at this value will minimize second harmonic distortion (imperfectly, because symmetry about the inflection point will not exist), the response to large signals will contain a substantial third harmonic component--a flattening of the peaks. This is undesirable in a wide band system. Also, operation at the inflection point implies close control of the bias field which may be difficult to achieve because of power dissipation limitations.

SUMMARY OF THE INVENTION

The MR head herein incorporates a simple and effective means of providing a bias field and a linear output response. Biasing may be achieved from enhancing coupling to a shield by placing the MR element closer to that shield than to another. It is thus possible to obtain a biasing field without an additional biasing conductor by simply using the excitation current in the MR element and asymmetrical placement of the element between the shields. This provides a lesser bias field at a given excitation current but does not result in a loss of signal from the shunting effect of the bias conductor. The choice of how much, if any, current should be diverted to the biasing conductor depends upon the power dissipation or current density desired.

Summarizing, Applicants' invention places an MR element off-center in the space between the shields. This enhances self-biasing of the MR element, apparently through preferential magnetic coupling to one shield, allowing a lower ratio of shunt current to MR current (and, therefore, increasing head efficiency). In one embodiment, the shunt layer itself may be eliminated.

The foregoing and other objects, features and advantages of the invention will be apparent from the following more particular description of preferred embodiments of the invention, as illustrated in the accompanying drawings.

DESCRIPTION OF THE PREFERRED EMBODIMENTS

Figure 1:
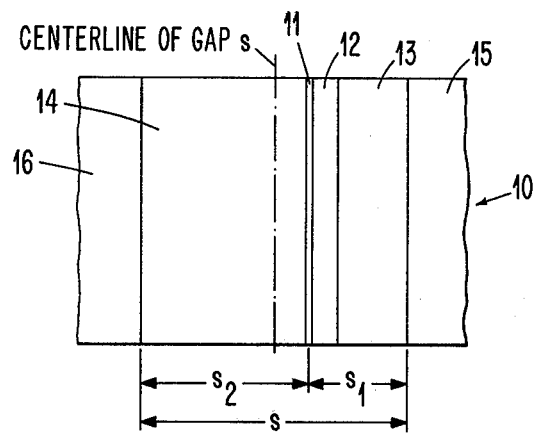
FIGS. 1 and 2 are cross-sectional views of two head embodiments incorporating the invention.
Figure 2:
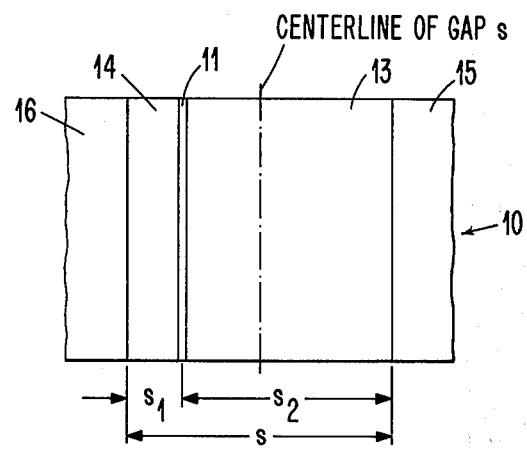

Referring now to FIG. 1, a shunt bias MR element comprising an MR layer 11 and a shunt layer 12 is sandwiched between appropriately coated ferrite enclosures or shields 15 and 16 separated by insulation layers 13 and 14 to form a head 10. FIG. 2 differs in that the shunt layer 12 is omitted. In both FIGS. 1 and 2, the MR layer 11 is off-center from the center line of the gap s between the shields 15 and 16, two possible positions being illustrated. The point along the gap s upon which the MR layer 11 is placed is represented by the ratio($S_2/S_1$) which may be within the range of five to one and one to one. However, satisfactory results are obtained for any ratio ($S_2/S_1$) over (or less than) one. The shunt layer 12 can normally be omitted for ratios greater than three because sufficient bias field is then obtained from the self-excitation of the MR element 11.

An MR layer 11 of material (such as NiFe) exhibiting the magnetoresistive effect is normally deposited on a shunt layer 12 composed of an appropriate material (such as Ti) which generates a bias field intercepting the MR layer 11 when electric current from a source I, supplied to connected conductive (for example, copper) leads, passes through both the MR layer 11 and shunt layer 12. For illustration, the MR layer may consist of 1.2 microinches (300 A) of Permalloy and the shunt layer 5.4 microinches (1,350 A) of titanium deposited, masked and etched by conventional means. The shunt layer 12 also provides an adhesive layer for joining the MR layer 11 to a 15-microinch (3,750 A) insulating layer 13 (such as $Al_2O_3$) previously deposited on one side of a shield 15. The shield may be any magnetically permeable material, such as Permalloy and ferrite. If desired, more than one MR layer and shunt bias layer combination could be provided with each MR layer off-center the intershielding spacing and, preferably, equidistant from the center. Another 35-microinch (8,750 A) insulating layer 14 and another shield 16 complete the assembly. The top edges of layers 11 and 12 are in the same plane as the top edge of ferrite shields 15, 16 and are, therefore, subject to smearing and errosion during both manufacture and use of the head 10. Thus, limiting the use of soft materials such as Permalloy and titanium to these very thin layers enhances the manufacturability and life of the head. The above dimensions give a total spacings of 56.6 microinches ( 14,650 A).

Referring to FIG. 2, at high values of asymmetry, $(S_2/S_1) > 4$ sufficient bias field is obtained in the element from its own excitation current and asymmetric placement between shields, such that the shunt layer 12 of FIG. 1 may be dispensed with. The choice of how much, if any, current should be diverted to the biasing conductor depends upon the power dissipation or current density constraints of the application.

Figure 3:
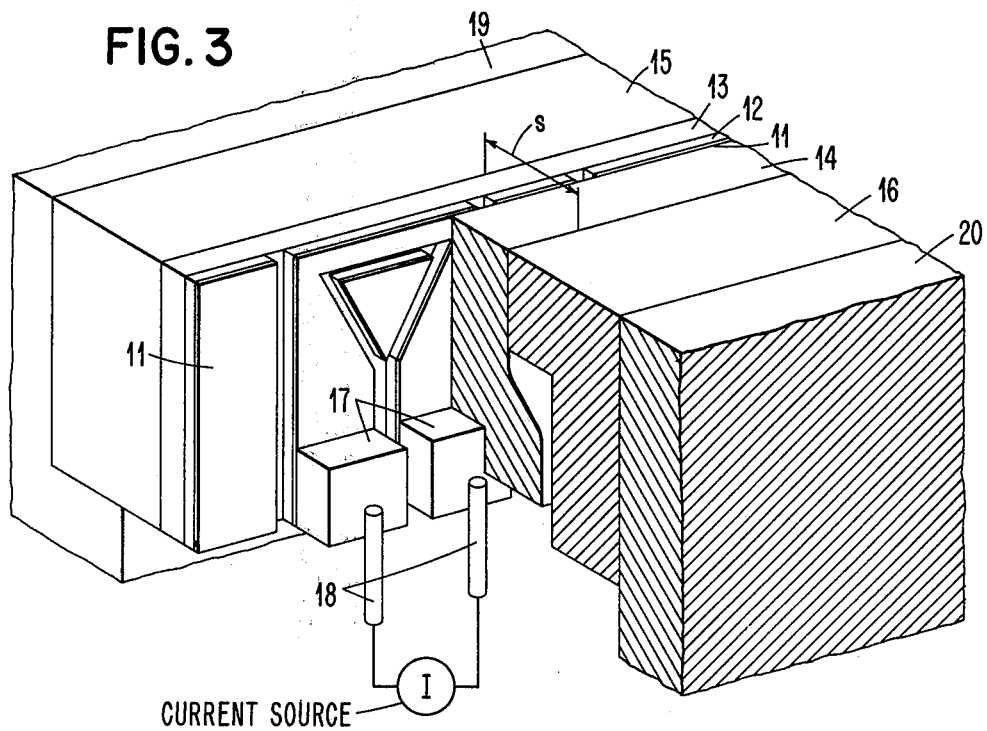
FIG. 3 is a three-dimensional view of a multitrack head based on the embodiment of FIG. 1.

An illustrative method of manufacturing the head of FIG. 1 follows with reference to FIG. 3:

1. One surface of ferrite shield 15 is polished flat and cleaned.
2. An $Al_2O_3$ layer 13 is deposited on the prepared surface of shield 15 to a depth of 3,750 A (15 microinches).
3. A titanium layer 12 is deposited on the $Al_2O_3$ layer 13 to a depth of 1,350 A (5.4 microinches).
4. A Permalloy (83% nickel, 17% iron) layer 11 is deposited on the titanium layer 12 to a depth of 300 A (1.2 microinches) in a magnetic field.
5. A relatively thick mechanical bar mask (not shown) of any appropriate material, such as stainless steel, defining the throat dimension, is placed on the Permalloy layer 11 to temporarily protect the top portion of the Permalloy layer.
6. A copper layer (including pads 17) is deposited to a depth of 5,000 A (20 microinches) on the bar mask and the exposed portion of the Permalloy layer 11.
7. A mask (not shown) is placed over the copper layer, as deposited in Step 6, to define copper pads 17 and the spaces between and within the head elements in FIG. 3, and an etchant is applied.
8. The mask is removed.
9. The incomplete head is tested by sensing the current induced in the individual elements when it is placed in an inductive field.
10. A layer 14 of $Al_2O_3$ is deposited on the entire surface exposed after Step 8 to a depth of 8,750 A (35 microinches).
11. A mask (not shown) is placed over the $Al_2O_3$ layer 14, exposing an area over the copper pads 17, and an etchant is applied.
12. The mask is removed.
13. Wire leads 18 are connected to the exposed areas of the pads 17.
14. A second ferrite shield 16 has a polished and cleaned surface mated with the completed subassembly as shown in FIG. 3.
15. Housings 19 and 20 are clamped about the shields 15 and 16.
16. The top surface of the completed subassembly and housing is ground and polished to a desired contour.

It will be understood that the sequence of steps above may be reversed to utilize shield 16 in Step 1 instead of shield 15, the relative positions of the adjacent layers 11 and 12 being irrelevant. The layer thicknesses also may be adjusted to place the Permalloy layer in a position asymmetric to the shields.

While the invention has been particularly shown and described with reference to preferred embodiments thereof, it will be understood by those skilled in the art that various changes in form and details may be made therein without departing from the spirit and scope of the invention.

What is claimed is:

1. A magnetic head for interacting with multiwavelength information recorded as magnetized areas spaced along a recording medium, including:
    a pair of magnetically permeable members having opposing faces spaced apart a fixed distance, on the order of and less than the shortest wavelength of the recorded information, the edge of each of the two members closest to the medium lying in the same plane; and
    a transducing element, including a single layer of material exhibiting the magnetoresistive effect disposed between the magnetically permeable members, closer to one of the members than the other, and having the edge closest to the medium lying in aforesaid plane.
2. The head of claim 1 wherein the magnetoresistive layer is juxtaposed with a layer of relatively conductive material.
3. A magnetic transducer for reading data having a pluraliy of wavelengths recorded as magnetized areas on a magnetic medium comprising:
    two spaced-apart shields each having an end coplanar with the other and defining a space therebetween, said space having one dimension less than the shortest wavelength of the electric signals; and
    one magnetoresistive element disposed in said spacing, at different distances from each shield, having one edge coplanar with the shield ends.
4. The transducer of claim 3 additionally comprising:
    one shunt bias element disposed in such space and in contact with the magnetoresistive element; and
    nonconductive and nonmagnetic insulating material disposed in said space between one shield and the magnetoresistive element.
5. A head for transducing electrical signals and the vertical component of magnetic fields from discrete areas of a medium, wherein the physical spacings of the recording on the medium and the electrical signal wavelength are related, comprising:
    a first shield in flux-coupling relationship with at least one magnetic field at a time, having one end in a plane perpendicular to the vertical component of said magnetic field;
    a second shield in flux-coupling relationship to aforesaid vertical component and having one end in said plane;

a plurality of layers of materials interposed between said first and second shields having one end in said plane and a thickness on the order of, and less than, the shortest signal wavelength, said materials including at least:

a layer of magnetoresistive material placed at a point between said shields which is closer to one shield than the other; and a juxtaposed layer of relatively conductive constant resistance material; and a source of electric current connected to selected ones of said layers.

6. In combination:

a magnetic medium carrying areas of magnetic recordings representing data recorded by signals having a range of wavelengths;

a number of member pairs of shielding material, each pair in flux-couupling relationship with one of said areas at a time, the shielding material being a magnetically permeable material selected from the class of materials including ferrite;

filling material, responsive to the vertical field component of the magnetic recordings, disposed between each pair of members and separating said members by a distance equal to and less than the minimum of said range of wavelengths, the filling material including magnetoresistive material disposed at a point between, and not equidistant, a pair of members and adjacent shunt biasing material;

a surface contour including one end of each of said member pairs and the filling material; and means for coupling electric current to said gap filling material.

7. A magnetic head for transducing magnetically recorded signals having a selected range of wavelengths and related spacing, comprising:

a first shield having an inner face;

an insulating material of a first thickness adjacent the inner face of said first shield;

a constant resistance material of a second thickness adjacent the insulating material on the side opposite said first shield;

a variable resistance material of a third thickness adjacent the constant resistance material on the side opposite the insulating material;

conductive material adjacent portions of the variable resistance material on the side opposite the constant resistance material;

additional insulating material of a fourth thickness, which does not equal the first thickness, adjacent the variable resistance and conductive material on the sides opposite the constant resistance material;

a second shield having an inner face adjacent the additional insulating material and spaced from the first ferrite material by the four thicknesses a distance less than the shortest wavelength in said range of wavelengths;

a housing surrounding the first and second shields and maintaining a retaining force thereon;

a surface contour common to aforesaid shields, insulating, constant resistance material, variable resistance material and said housing including an edge of each of the aforesaid; and a source of current connected to said conductive material.

8. The magnetic head of claim 7 wherein the spacing between the first and second ferrite materials is on the order of 30% to 40% of the smallest spacing between the magnetically recorded signals.

9. A magnetic transducer for reading the vertical component of data having a plurality of wavelengths, generally in the range of about 1,000 to less than 50 microinches, recorded as magnetized areas on a magnetic medium comprising:

two spaced-apart shields each having an end coplanar with the other and defining a space therebetween, said space having one dimension less than the shortest wavelength of the electric signals; and one magnetoresistive element disposed in said spacing, at a point on said dimension other than its center, and having one edge coplanar with the shield ends.

10. The transducer of claim 9 wherein the MR element is positioned at a point on said dimension which is located at distances from said shields which are in a ratio on the order of approximately four to one.

11. The transducer of claim 9, additionally comprising:

at least one shunt bias element disposed in such space and in contact with said magnetoresistive element; and nonconductive and nonmagnetic insulating material disposed in said space between one shield and the magnetoresistive element.

12. The transducer of claim 11 wherein the MR element is positioned at a point on said dimension which is located at distances from said shields which are in a ratio on the order of approximately two to one.

13. The transducer of claim 12 wherein the thickness of the magnetoresistive element is on the order of about one microinch and larger.

14. The transducer of claim 12 wherein the height of the magnetoresistive element is on the order of about 300 microinches and larger.

15. The transducer of claim 13 wherein the height of the magnetoresistive element is on the order of about 300 microinches and larger.

* * * * *